US010021582B2

(12) United States Patent
Lyu

(10) Patent No.: US 10,021,582 B2
(45) Date of Patent: Jul. 10, 2018

(54) DELAY ESTIMATION METHOD AND APPARATUS FOR MULTIPLE INPUT MULTIPLE OUTPUT COMMUNICATIONS SYSTEM, AND SYSTEM

(71) Applicant: HUAWEI TECHNOLOGIES CO., LTD., Shenzhen (CN)

(72) Inventor: Rui Lyu, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 65 days.

(21) Appl. No.: 15/048,378

(22) Filed: Feb. 19, 2016

(65) Prior Publication Data

US 2016/0174090 A1 Jun. 16, 2016

Related U.S. Application Data

(63) Continuation of application No. PCT/CN2013/081921, filed on Aug. 21, 2013.

(51) Int. Cl.
*H04L 1/00* (2006.01)
*H04W 24/08* (2009.01)
(Continued)

(52) U.S. Cl.
CPC .......... *H04W 24/08* (2013.01); *H04B 7/0417* (2013.01); *H04B 7/0456* (2013.01);
(Continued)

(58) Field of Classification Search
CPC ... H04W 24/08; H04B 7/0456; H04B 17/104; H04L 5/0048
(Continued)

(56) References Cited

U.S. PATENT DOCUMENTS 7,561,629 B2 * 7/2009 Miyatani .................. H04L 5/06
330/149
2009/0034503 A1 * 2/2009 Kim ...................... H04L 5/0007
370/343
(Continued)

FOREIGN PATENT DOCUMENTS

CN 101326783 12/2008
CN 102158459 8/2011
(Continued)

OTHER PUBLICATIONS

International Search Report, dated May 20, 2014, in corresponding International Application No. PCT/CN2013/081921 (12 pp.).
(Continued)

*Primary Examiner* — Faisal Choudhury
(74) *Attorney, Agent, or Firm* — Staas & Halsey LLP

(57) ABSTRACT

A delay estimation method for a multiple input multiple output communications system, includes: calculating, by a receiver, a channel response matrix of a Multiple input multiple output MIMO communications system, where there are n transmit channels and m receive channels in the MIMO communications system, n≥2, m≥2, and the channel response matrix includes channel responses of n*m sub-channels; calculating, by the receiver, an integer delay, relative to a reference sub-channel, of each of the n*m sub-channels according to the channel response matrix, where the reference sub-channel is any sub-channel in the n*m sub-channels; calculating, by the receiver, fraction delays of the n*m sub-channels according to the channel response matrix; and separating out, by the receiver, delays of the m receive channels according to delays of the n*m sub-channels.

14 Claims, 9 Drawing Sheets

(51) Int. Cl.
*H04B 7/0417* (2017.01)
*H04L 25/02* (2006.01)
*H04B 17/21* (2015.01)
*H04B 7/0456* (2017.01)
*H04L 5/00* (2006.01)
*H04B 17/10* (2015.01)

(52) U.S. Cl.
CPC ........... *H04B 17/104* (2015.01); *H04B 17/21* (2015.01); *H04L 5/0048* (2013.01); *H04L 25/0204* (2013.01); *H04L 25/0212* (2013.01); *H04L 25/0222* (2013.01)

(58) Field of Classification Search
USPC ........................................................ 370/252
See application file for complete search history.

(56) References Cited

U.S. PATENT DOCUMENTS

2009/0268787 A1   10/2009  Cairns et al.
2011/0002403 A1*  1/2011   Wilhelmsson ........ H04L 5/0007
                                                        375/260

FOREIGN PATENT DOCUMENTS

WO    WO2010/011078    1/2010
WO    WO2013/056398    4/2013

OTHER PUBLICATIONS

Extended European Search Report, dated Jun. 21, 2016, in corresponding European Application No. 13891755.4 (7 pp.).
International Search Report dated May 20, 2014, in corresponding International Application No. PCT/CN2013/081921.

* cited by examiner

US 10,021,582 B2

DELAY ESTIMATION METHOD AND APPARATUS FOR MULTIPLE INPUT MULTIPLE OUTPUT COMMUNICATIONS SYSTEM, AND SYSTEM

CROSS-REFERENCE TO RELATED APPLICATIONS

This application is a continuation of International Application No. PCT/CN2013/081921, filed on Aug. 21, 2013, which is hereby incorporated by reference in its entirety.

TECHNICAL FIELD

Embodiments of the present invention relate to the field of communications, and in particular, to a delay estimation method and apparatus for a multiple input multiple output communications system, and a system.

BACKGROUND

A multiple input multiple output (MIMO) technology has become one of key technologies in the field of wireless communications. After continuous development in recent years, the MIMO technology is increasingly applied to various wireless communications systems. With regard to a wireless broadband mobile communications system, content related to the MIMO technology has been added to the 3rd generation partnership project (3GPP) standard, and the MIMO technology will also be applied to B3G and 4G systems. In a wireless broadband access system, the MIMO technology is also used in standards such as 802.16e, 802.11n, and 802.20 that are being formulated. In the research of other wireless communications systems, such as an ultra-wideband (UWB) system and a cognitive radio (CR) system, application of the MIMO technology is considered. In a MIMO communications system, differences exist between channels in a signal processing manner, component, channel path, and connection structure, and a delay generally exists between signals on the channels. When the delay is large, asynchronism between the channels in receiving a signal causes severe intersymbol interference on the side of a receiver. Therefore, delays of the channels need to be estimated, so as to synchronize the channels.

In the prior art, a commonly used time estimation is an offline calibration method based on measurement. Before a communications system is put into use, by using a delay of one transmit or receive channel as a reference, a delay is independently measured for each transmit or receive channel by using a meter. A problem of this method is that, this offline test method cannot measure a delay that dynamically changes, and is difficult to achieve high precision.

SUMMARY

Embodiments of the present invention provide a delay estimation method and apparatus for a multiple input multiple output communications system, and a system, which can estimate integer delays and fraction delays of channels in a MIMO communications system online in real time, and achieve high measurement precision.

According to a first aspect, an embodiment of the present invention provides a delay estimation method for a multiple input multiple output communications system, including:

calculating, by a receiver, a channel response matrix of a Multiple input multiple output MIMO communications system, where there are n transmit channels and m receive channels in the MIMO communications system, n≥2, m≥2, n and m are both integers, and the channel response matrix includes channel responses of n*m sub-channels;

calculating, by the receiver, an integer delay, relative to a reference sub-channel, of each of the n*m sub-channels according to the channel response matrix, where the reference sub-channel is any sub-channel in the n*m sub-channels;

calculating, by the receiver, fraction delays of the n*m sub-channels according to the channel response matrix; and separating out, by the receiver, delays of the m receive channels according to delays of the n*m sub-channels.

In a first possible implementation manner, the step of calculating, by the receiver, an integer delay, relative to a reference sub-channel, of each of the n*m sub-channels according to the channel response matrix includes:

detecting a peak position deviation between a channel response of a to-be-measured sub-channel and a channel response of the reference sub-channel; and calculating an integer delay of the to-be-measured sub-channel according to the peak position deviation, where an integer delay of the reference sub-channel is 0.

With reference to the first aspect or the first possible implementation manner, in a second possible implementation manner, the step of calculating, by the receiver, fraction delays of the n*m sub-channels according to the channel response matrix includes:

performing delay extension processing on the channel response of the to-be-measured sub-channel by 0 multiple of, and 1/K, 2/K, . . . , and (K−1)/K of a symbol period, to obtain K extended channel responses, where K≥2 and is an integer; and separately calculating channel entropies of the K extended channel responses, and selecting a delay of a non-integer symbol period as a fraction delay of the to-be-measured sub-channel, where the non-integer symbol period corresponds to a maximum channel entropy.

With reference to any one of the first aspect to the second possible implementation manner, in a third possible implementation manner, the step of calculating, by a receiver, a channel response matrix of a Multiple input multiple output MIMO communications system includes:

calculating, by the receiver, the channel response matrix of the MIMO communications system according to a pilot sent by a transmitter.

With reference to the third possible implementation manner of the first aspect, in a fourth possible implementation manner, the channel response matrix includes a time-domain channel response matrix or a frequency-domain channel response matrix.

With reference to the fourth possible implementation manner of the first aspect, in a fifth possible implementation manner, the delays of the m receive channels are receive delays of the receive channels, and the method further includes:

separating out, by the receiver, transmit delays of the n transmit channels according to the delays of the n*m sub-channels, and returning n transmit delays to the transmitter, so that the transmitter separately performs delay compensation on corresponding transmit channels according to the n transmit delays; and separately performing, by the receiver, delay compensation on corresponding receive channels according to m receive delays.

With reference to the fourth possible implementation manner of the first aspect, in a sixth possible implementation manner, the delays of the m receive channels are mixed delays of the receive channels, and the method further includes:

separately performing, by the receiver, delay compensation on corresponding receive channels by using m mixed delays.

With reference to any one of the first aspect to the sixth possible implementation manner, in a seventh possible implementation manner, the step of separating out, by the receiver, transmit delays of the n transmit channels and receive delays of the m receive channels according to delays of the n*m sub-channels includes:

separating out, by the receiver, the delays of the m receive channels from the delays of the n*m sub-channels by using a variable separation method.

According to a second aspect, the present invention provides a delay estimation apparatus for a multiple input multiple output communications system, including:

a response calculation module, configured to calculate a channel response matrix of a Multiple input multiple output MIMO communications system, where there are n transmit channels and m receive channels in the MIMO communications system, n≥2, m≥2, n and m are both integers, and the channel response matrix includes channel responses of n*m sub-channels;

an integer delay calculation module, configured to calculate an integer delay, relative to a reference sub-channel, of each of the n*m sub-channels according to the channel response matrix, where the reference sub-channel is any sub-channel in the n*m sub-channels;

a fraction delay calculation module, configured to calculate fraction delays of the n*m sub-channels according to the channel response matrix; and a delay separation module, configured to separate out delays of the m receive channels according to delays of the n*m sub-channels.

In a first possible implementation manner, the integer delay calculation module includes:

a detection unit, configured to detect a peak position deviation between a channel response of a to-be-measured sub-channel and a channel response of the reference sub-channel; and a first calculation unit, configured to calculate an integer delay of the to-be-measured sub-channel according to the peak position deviation, where an integer delay of the reference sub-channel is 0.

With reference to the second aspect or the first possible implementation manner, in a second possible implementation manner, the fraction delay calculation module includes:

an extension unit, configured to perform delay extension processing on the channel response of the to-be-measured sub-channel by 0 multiple of, and 1/K, 2/K, . . . , and (K−1)/K of a symbol period, to obtain K extended channel responses, where K≥2 and is an integer; and a second calculation unit, configured to separately calculate channel entropies of the K extended channel responses, and select a delay of a non-integer symbol period as a fraction delay of the to-be-measured sub-channel, where the non-integer symbol period corresponds to a maximum channel entropy.

With reference to any one of the second aspect to the second possible implementation manner, in a third possible implementation manner, the response calculation module is configured to calculate the channel response matrix of the MIMO communications system according to a pilot sent by a transmitter.

With reference to the third possible implementation manner of the second aspect, in a fourth possible implementation manner, the channel response matrix includes a time-domain channel response matrix or a frequency-domain channel response matrix.

With reference to the fourth possible implementation manner of the second aspect, in a fifth possible implementation manner, the delays of the m receive channels are receive delays of the receive channels, and the apparatus further includes:

a feedback module, configured to separate out transmit delays of the n transmit channels according to the delays of the n*m sub-channels, and return n transmit delays to the transmitter, so that the transmitter separately performs delay compensation on corresponding transmit channels according to the n transmit delays; and a first compensation module, configured to separately perform delay compensation on corresponding receive channels according to m receive delays.

With reference to the fourth possible implementation manner of the second aspect, in a sixth possible implementation manner, the delays of the m receive channels are mixed delays of the receive channels, and the apparatus further includes:

a second compensation module, configured to separately perform delay compensation on corresponding receive channels by using m mixed delays.

With reference to any one of the second aspect to the sixth possible implementation manner, in a seventh possible implementation manner, the delay separation module is configured to separate out the delays of the m receive channels from the delays of the n*m sub-channels by using a variable separation method.

According to a third aspect, the present invention provides a delay estimation apparatus for a multiple input multiple output communications system, including a processor, a memory, an input apparatus, and an output apparatus, where the memory stores a set of program code, and the processor is configured to invoke the program code that is stored in the memory, to perform the following operations:

calculating, by a receiver, a channel response matrix of a Multiple input multiple output MIMO communications system, where there are n transmit channels and m receive channels in the MIMO communications system, n≥2, m≥2, n and m are both integers, and the channel response matrix includes channel responses of n*m sub-channels;

calculating, by the receiver, an integer delay, relative to a reference sub-channel, of each of the n*m sub-channels according to the channel response matrix, where the reference sub-channel is any sub-channel in the n*m sub-channels;

calculating, by the receiver, fraction delays of the n*m sub-channels according to the channel response matrix; and separating out, by the receiver, delays of the m receive channels according to delays of the n*m sub-channels.

In a first possible implementation manner, the processor is specifically configured to detect a peak position deviation between a channel response of a to-be-measured sub-channel and a channel response of the reference sub-channel; and calculate an integer delay of the to-be-measured sub-channel according to the peak position deviation, where an integer delay of the reference sub-channel is 0.

With reference to the third aspect or the first possible implementation manner, in a second possible implementation manner, the processor is specifically configured to:

perform delay extension processing on the channel response of the to-be-measured sub-channel by 0 multiple of, and 1/K, 2/K, . . . , and (K−1)/K of a symbol period, to obtain K extended channel responses, where K≥2 and is an integer; and separately calculate channel entropies of the K extended channel responses, and select a delay of a non-integer symbol period as a fraction delay of the to-be-measured sub-channel, where the non-integer symbol period corresponds to a maximum channel entropy.

With reference to any one of the third aspect to the second possible implementation manner, in a third possible implementation manner, the processor is specifically configured to calculate the channel response matrix of the MIMO communications system according to a pilot sent by a transmitter.

With reference to the third possible implementation manner of the third aspect, in a fourth possible implementation manner, the channel response matrix includes a time-domain channel response matrix or a frequency-domain channel response matrix.

With reference to the fourth possible implementation manner of the third aspect, in a fifth possible implementation manner, the delays of the m receive channels are receive delays of the receive channels, and the processor is further configured to:

separate out transmit delays of the n transmit channels according to the delays of the n*m sub-channels, and returning n transmit delays to the transmitter, so that the transmitter separately performs delay compensation on corresponding transmit channels according to the n transmit delays; and separately perform delay compensation on corresponding receive channels according to m receive delays.

With reference to the fourth possible implementation manner of the third aspect, in a sixth possible implementation manner, the delays of the m receive channels are mixed delays of the receive channels, the processor is further configured to:

separately perform delay compensation on corresponding receive channels by using m mixed delays.

With reference to any one of the third aspect to the sixth possible implementation manner, in a seventh possible implementation manner, the processor is specifically configured to separate out the delays of the m receive channels from the delays of the n*m sub-channels by using a variable separation method.

According to a fourth aspect, the present invention provides a receiver, including any of the foregoing delay estimation apparatuses for a multiple input multiple output communications system.

According to a fifth aspect, the present invention provides a MIMO communications system, including a transmitter and the foregoing receiver.

The embodiments of the present invention have the following beneficial effects:

By estimating a channel response matrix of a MIMO communications system, a receiver calculates an integer delay and a fraction delay, relative to a reference sub-channel, of each sub-channel, and separates out a delay of each receive channel by using an obtained calculation result, so that a delay at a receive end in the MIMO communications system can be measured online in real time, and high measurement precision is achieved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention may be applied to a MIMO communications system, for example, a wireless communications system that is compatible with the Third Generation Partnership Project (Third Generation Partnership Project, 3GPP) Long Term Evolution (Long Term Evolution, LTE). However, the present invention may also be applied to other wireless communications systems, for example, wireless communications systems that are compatible with a technical standards such as LTE-Advanced (LTE-A) and WiMAX, where these wireless communications systems can improve a throughput of a communications system in a multiple input multiple output manner.

Figure 1:
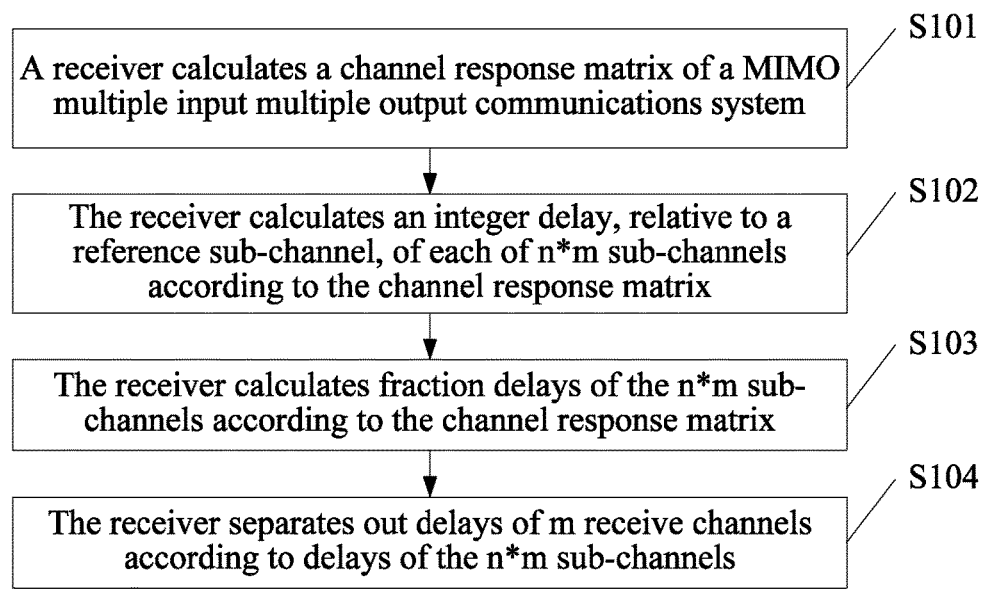
FIG. 1 is a schematic flowchart of a delay estimation method for a multiple input multiple output communications system according to an embodiment of the present invention.

Referring to FIG. 1, FIG. 1 is a schematic flowchart of a delay estimation method for a multiple input multiple output communications system according to an embodiment of the present invention. In this embodiment, the method includes the following steps:

S101: A receiver calculates a channel response matrix of a Multiple input multiple output MIMO communications system.

Specifically, the receiver receives a high frequency signal sent by a transmitter, performs processing such as down conversion, amplifying and filtering, demodulation, and A/D on the high frequency signal by using a local carrier, to convert the high frequency signal into a digital signal. There are n transmit channels and m receive channels in the MIMO communications system, where n≥2 and m≥2. The receiver may calculate the channel response matrix of the MIMO communications system according to a pilot in a transmit signal, which is specifically: y=H*x+p, where y is a receive signal, H is a channel response matrix, x is a pilot, p is a noise of the receiver, x, y, and p are all digital signals, and the channel response matrix, which is calculated by the receiver, of the n*m sub-channels is as follows:

$$H = \begin{bmatrix} h_{11} & h_{12} & \ldots & h_{1m} \\ h_{21} & h_{22} & \ldots & h_{2m} \\ \ldots & \ldots & h_{ij} & \ldots \\ h_{n1} & h_{n2} & \ldots & h_{nm} \end{bmatrix}$$

where $h_{ij}$ is a channel response of a sub-channel $C_{ij}$ that is formed from an $i^{th}$ transmit channel to a $j^{th}$ receive channel in the MIMO communications system, where 1≤i≤n, 1≤j≤m, and there are channel responses of the n*m sub-channels in the channel response matrix.

It may be understood that, the receiver may also estimate the channel response matrix by using another method, for example, estimate the channel response matrix of the MIMO communications system directly by using a received transmit signal, where the channel response matrix may be a time-domain channel response matrix or a frequency-domain channel response matrix, which is not limited in the present invention.

S102: The receiver calculates an integer delay, relative to a reference sub-channel, of each of the n*m sub-channels according to the channel response matrix.

Specifically, any sub-channel is selected from the n*m sub-channels in advance and is used as a reference sub-channel for alignment, and integer delays of other sub-channels are all relative integer delays that are calculated according to the reference sub-channel. In the following exemplary description, it is assumed that, a sub-channel $C_{11}$ that is formed from a first transmit channel to a first receive channel is the reference sub-channel, and a channel response of the reference sub-channel is $h_{11}$.

The receiver calculates the integer delay, relative to the reference sub-channel, of each sub-channel in the n*m sub-channels, where the integer delay is an integer multiple of a symbol period, and the symbol period refers to element duration in a communications system, that is, a reciprocal of a sampling rate. A method for calculating the integer delay may be an autocorrelation method or a sequence synchronization method, which is not limited in the present invention. It may be understood that, an integer delay of the reference sub-channel is calculated by using the reference sub-channel as a reference object, and a value of the integer delay is 0.

S103: The receiver calculates fraction delays of the n*m sub-channels according to the channel response matrix.

Specifically, a fraction delay is a fractional multiple of the symbol period, the symbol period is less than a multiple of 1, and a delay of each sub-channel in the n*m sub-channels includes an integer delay and a fraction delay. A delay of the sub-channel $C_{ij}$ is set to $\Delta T_{ij} = \Delta_{ij} + \tau_{ij}$, where $\Delta_{ij}$ is an integer delay, $\tau_{ij}$ is a fraction delay, 1≤i≤n, and 1≤j≤m.

The receiver calculates the integer delay, relative to the reference sub-channel, of each of the n*m sub-channels in S102, to obtain n*m integer delays, and calculates the fraction delays of the n*m sub-channels in S103, to obtain n*m fraction delays.

In this embodiment of the present invention, a sequence of calculating an integer delay and a fraction delay of each sub-channel is not limited, that is, a sequence between S102 and S103 is not limited.

S104: The receiver separates out receive delays of m receive channels according to delays of the n*m sub-channels.

Specifically, the delays of the m receive channels are receive delays or mixed delays, where a receive delay refers to a delay that occurs after a receive signal passes through a receive channel, and a mixed delay refers to a delay that occurs after a signal passes through a transmit channel and a receive channel. The receiver separates out the delays of the m receive channels according to n*m delays, where the n*m delays herein are obtained by superimposing the integer delays and the fraction delays. In this embodiment, the delays obtained by means of estimation according to S102 and S103 are n×m delays obtained after the transmit channels and the receive channels are cross-superimposed. A delay that is obtained by superimposing the m receive delays in a cross channel manner approximates a sum of an integer delay and a fraction delay that are estimated in the foregoing, where the m receive delays are separated out by the receiver by using a separation algorithm. The separation algorithm is not limited in the present invention, for example, the receiver may use a simple variable separation method as a solution.

Optionally, in this embodiment of the present invention, the receiver periodically calculates the channel response matrix of the MIMO communications system, estimates a delay of each transmit channel and a delay of each receive channel by using the channel response matrix, and monitors a change in the delays in real time.

According to the description in the foregoing embodiment, the present invention has the following advantages:

By estimating a channel response matrix of a MIMO communications system, a receiver calculates a fraction delay of each sub-channel and an integer delay relative to a reference sub-channel, and separates out a delay of each receive channel by using an obtained calculation result, so that a delay at a receive end in the MIMO communications system can be measured online in real time, and high measurement precision is achieved.

Figure 2:
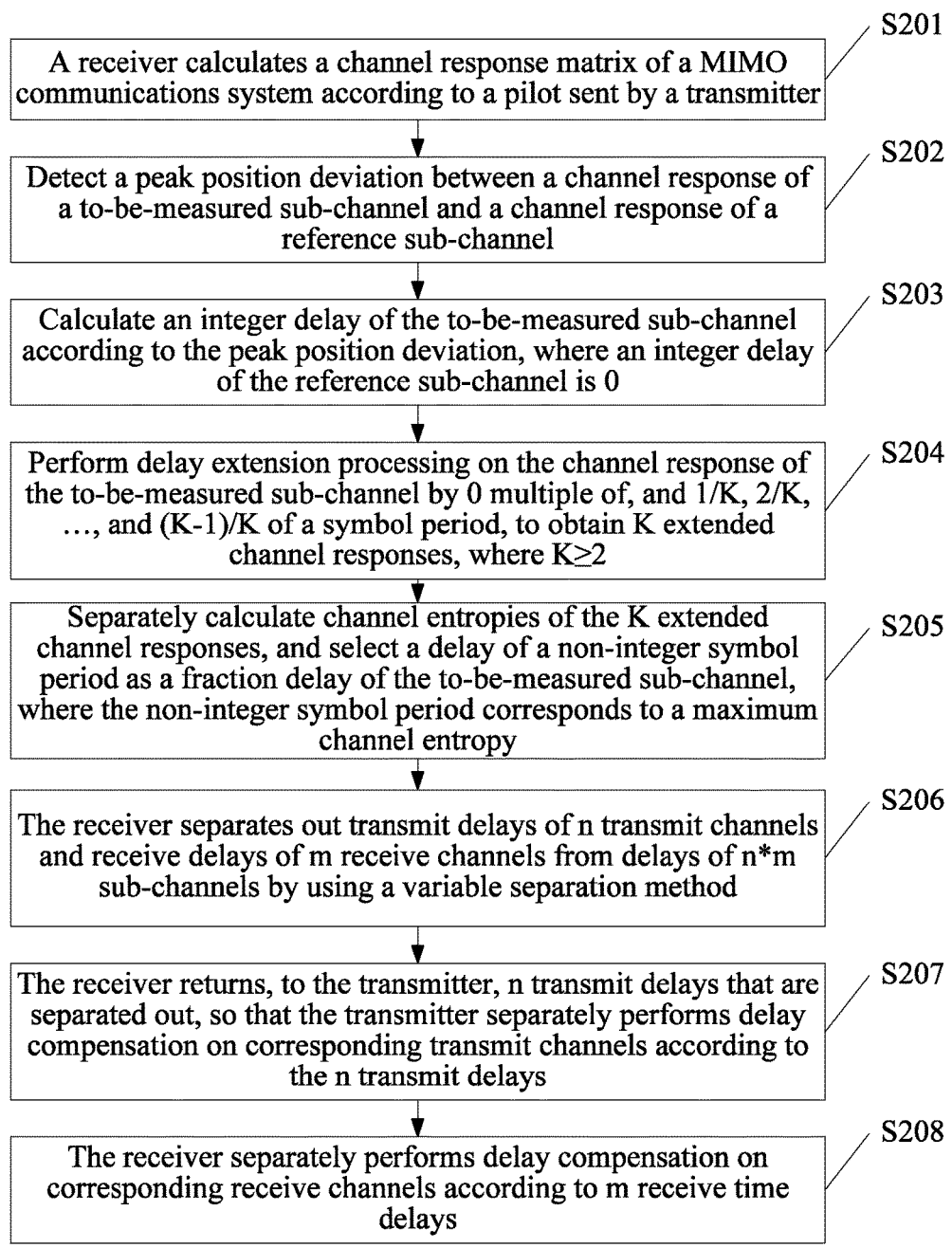
FIG. 2 is another schematic flowchart of a delay estimation method for a multiple input multiple output communications system according to an embodiment of the present invention.

Referring to FIG. 2, FIG. 2 is another schematic flowchart of a delay estimation method for a multiple input multiple output communications system according to an embodiment of the present invention. In this embodiment, the method includes the following steps:

S201: A receiver calculates a channel response matrix of a MIMO communications system according to a pilot sent by a transmitter.

Specifically, there are n transmit channels and m receive channels in the MIMO communications system, where n≥2 and m≥2. The receiver may calculate the channel response matrix of the MIMO communications system according to a pilot in a transmit signal, where the pilot refers to a known symbol that is inserted by the transmitter into a sent data stream. A method for calculating the channel response matrix is specifically: y=H*x+p, where y is a receive signal, H is a channel response matrix, x is a pilot, p is a noise of the receiver, and the channel response matrix, which is calculated by the receiver, of n*m sub-channels is as follows:

$$H = \begin{bmatrix} h_{11} & h_{12} & \ldots & h_{1m} \\ h_{21} & h_{22} & \ldots & h_{2m} \\ \ldots & \ldots & h_{ij} & \ldots \\ h_{n1} & h_{n2} & \ldots & h_{nm} \end{bmatrix}$$

where $h_{ij}$ is a channel response of a sub-channel $C_{ij}$ that is formed from an $i^{th}$ transmit channel to a $j^{th}$ receive channel in the MIMO communications system, where 1≤i≤n, 1≤j≤m, and there are channel responses of the n*m sub-channels in the channel response matrix.

It may be understood that, the receiver may estimate the channel response matrix by using any other channel estimation method, for example, a time-domain or frequency-domain method, which is not limited in the present invention; and the channel response matrix may be a time-domain channel response matrix or a frequency-domain channel response matrix.

S202: Detect a peak position deviation between a channel response of a to-be-measured sub-channel and a channel response of a reference sub-channel.

Specifically, any sub-channel is selected from the n*m sub-channels in advance and is used as a reference sub-channel for alignment, and integer delays of other sub-channels are all relative integer delays that are calculated according to the reference sub-channel. In the following exemplary description, it is assumed that, a sub-channel $C_{11}$ that is formed from a first transmit channel to a first receive channel is the reference sub-channel, and a channel response of the reference sub-channel is $h_{11}$.

Figure 3:
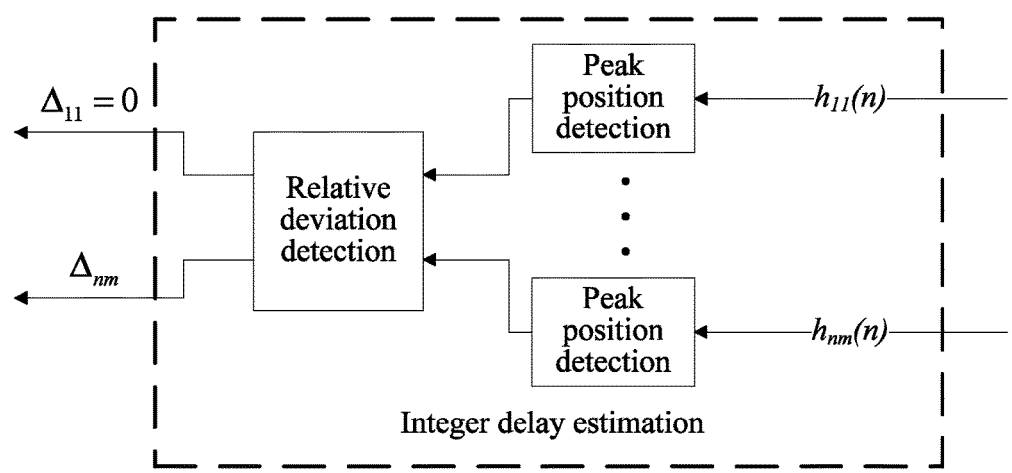
FIG. 3 is a schematic diagram of a method for calculating an integer delay in FIG. 2.

It can be known from a property of a digital signal that, a delay of an integer symbol period causes translation of several sampling points of a channel response. With reference to FIG. 3, a method for calculating an integer delay of a sub-channel is specifically as follows: one sub-channel that needs to be measured is selected from the n*m sub-channels, and is used as the to-be-measured sub-channel, and the receiver calculates a peak position in the channel response of the to-be-measured sub-channel and a peak position in the channel response of the reference sub-channel, where the peak position refers to a position of a maximum amplitude response point in the channel response. In FIG. 3, it is assumed that the selected reference sub-channel is $C_{11}$, that is, the sub-channel from the first transmit channel to the first receive channel, a channel response corresponding to the reference sub-channel is $h_{11}(n)$, and an integer delay corresponding to the sub-channel $C_{11}$ is 0. Peak position detection is performed on a channel response ($h_{11}(n)-h_{nm}(n)$) of each sub-channel in the n*m sub-channels, then a peak position deviation between an obtained peak position of each sub-channel and the reference sub-channel is calculated, and an integer delay $\Delta_{ij}$, relative to the reference sub-channel, of each sub-channel is obtained according to the position deviation, where 1≤i≤n, 1≤j≤m, and i and j are both integers.

S203: Calculate an integer delay of the to-be-measured sub-channel according to the peak position deviation, where an integer delay of the reference sub-channel is 0.

Specifically, the receiver determines, according to the peak position of the to-be-measured sub-channel and the peak position of the reference sub-channel that are calculated in step 202, a peak position deviation between the two peak positions, where the peak position deviation is the integer delay, relative to the reference sub-channel, of the to-be-measured sub-channel. The receiver calculates an integer delay of each sub-channel by using this calculation method.

S204: Perform delay extension processing on the channel response of the to-be-measured sub-channel by 0 multiple of, and 1/K, 2/K, . . . , and (K−1)/K of a symbol period, to obtain K extended channel responses, where K≥2.

Figure 4:
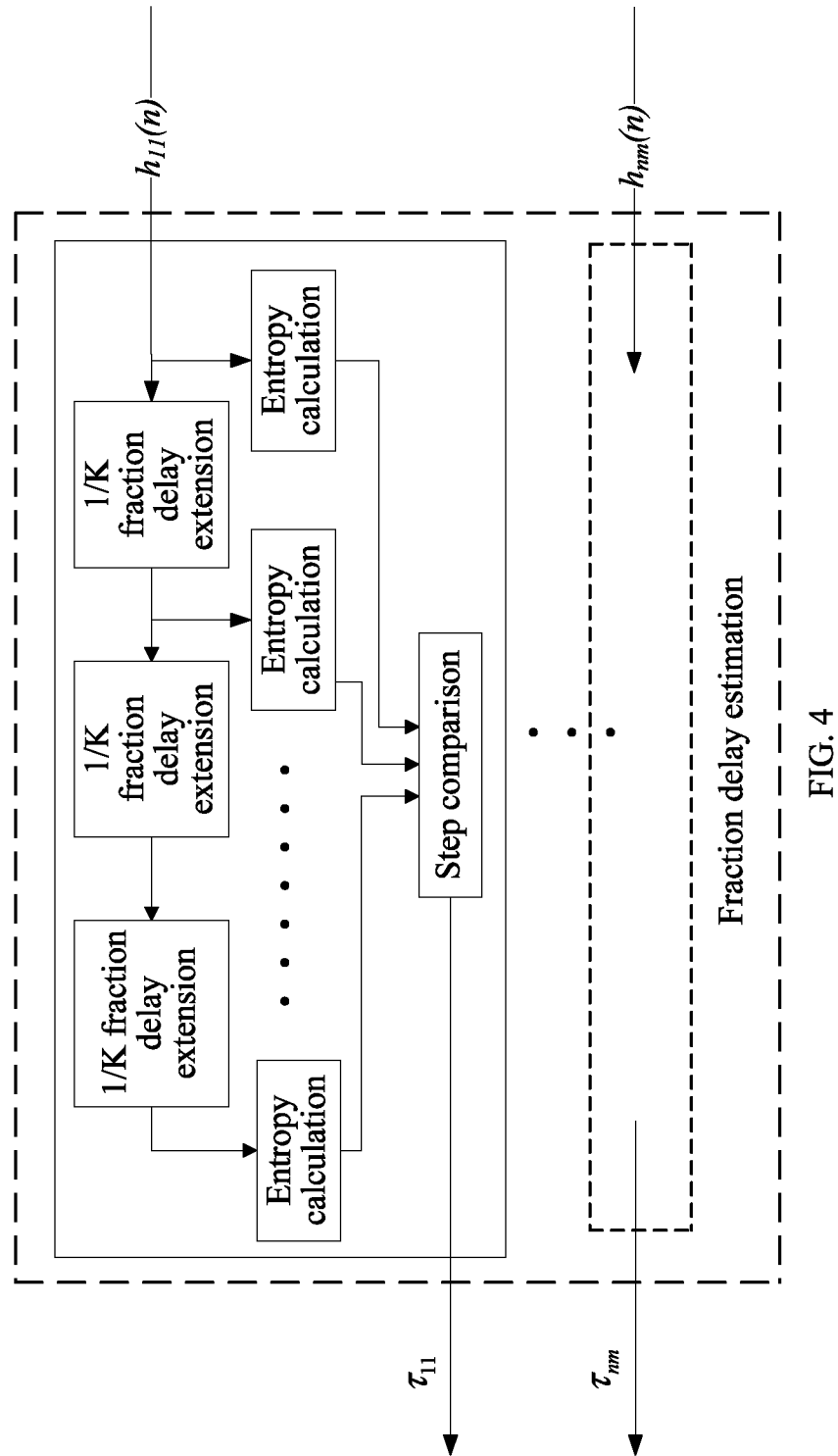
FIG. 4 is a schematic diagram of a method for calculating a fraction delay in FIG. 2.

Specifically, with reference to FIG. 4, a specific estimation method is that, one sub-channel that needs to be measured is selected from the n*m sub-channels, and is used as the to-be-measured sub-channel (for example, a sub-channel $C_{11}$ shown in FIG. 4); delay extension processing is performed on the channel response of the to-be-measured sub-channel by 0 multiple of, and 1/K, 2/K, . . . , and (K−1)/K of the symbol period, to obtain the K extended channel responses, where K≥2. Assuming that K=3 and the channel response $h_{11}(n)$ of the to-be-measured sub-channel is obtained from the channel response matrix, delay extension processing is performed on the obtained channel response by 0 multiple of, and ⅓ and ⅔ of the symbol period, to obtain $h_{11}(n)$, $h_{11}(n-⅓)$, and $h_{11}(n-⅔)$ correspondingly.

S205: Separately calculate channel entropies of the K extended channel responses, and select a delay of a non-integer symbol period as a fraction delay of the to-be-measured sub-channel, where the non-integer symbol period corresponds to a maximum channel entropy.

Specifically, it can be known from a property of a digital signal that, a delay of a fractional symbol period causes extension of a channel response, and to quantize a degree of the extension of the channel response, a channel entropy of a channel response f (n) is defined as:

$$\text{Ent\_cr} = \sum_{i=1}^{n} (p_i \cdot \log(p_i))$$

$$p_i = \frac{\text{abs}(f(i))}{\sum_{i=1}^{n} \text{abs}(f(i))}$$

where f (n) is a digital sequence, n is a length of the digital sequence, Ent_cr is a channel entropy, abs(f(n)) indicates calculation of an absolute value of an amplitude value of an $i^{th}$ point in f(n), and log(.) indicates an operation for calculating a logarithm.

It can be known from a property of a convex function of an entropy function that, a greater degree to which a fraction delay deviates from an integer delay indicates greater extension of a channel response and a smaller channel entropy, and therefore a length of the fraction delay can be estimated by calculating a channel entropy of a delayed channel response.

Channel entropies of the three extended channel responses $h_{11}(n)$, $h_{11}(n-\frac{1}{3})$, and $h_{11}(n-\frac{2}{3})$ that are obtained in step 204 are calculated according to the foregoing formula, the three channel entropies that are obtained by means of calculation are compared with each other, and a delay of a fractional symbol period corresponding to a maximum channel entropy of the three channel entropies is used as a fraction delay. Assuming that a channel entropy of the extended channel response $h_{11}(n-\frac{1}{3})$ is maximum, a fraction delay $\tau_{11}$ of the to-be-measured sub-channel is ⅓ of the symbol period. An operating principle of the fraction delay may be described as follows:

$$\tau_{ij} = \max_{0 \leq t \leq 1} \{\text{Ent\_cr}(IFT\{FT\{h_{ij}(n)\} \cdot e^{-j\omega t}\})\}.$$

To obtain a more accurate fraction delay, K may be set to a large integer. When a value of K is large, calculation complexity of the receiver is increased. Therefore, when the value of K is selected, a balance between accuracy and complexity needs to be achieved. A fraction delay of each sub-channel in the n*m sub-channels is calculated by using the methods in step 204 and step 205, that is, $\tau_{11}$-$\tau_{nm}$ shown in FIG. 4 are calculated.

In this embodiment of the present invention, the channel entropy function may be replaced with a target function that self-defines a delay as an independent variable, where the target function meets a property of a decreasing function, that is, a longer delay indicates a smaller value of the target function, and a shorter delay indicates a larger value of the target function. The receiver may estimate a fraction delay of a sub-channel by using the target function.

In this embodiment of the present invention, a sequence of the steps for calculating the integer delay and the fraction delay of the to-be-measured sub-channel is not limited. The receiver may first calculate the fraction delay of the to-be-measured sub-channel, and then calculate the integer delay, that is, first perform steps 204 and 205, and then perform steps 202 and 203.

S206: The receiver separates out transmit delays of n transmit channels and m receive delays from delays of n*m sub-channels by using a variable separation method.

Specifically, the receiver separates out the transmit delays of the n transmit channels and the receive delays of the m receive channels according to obtained integer delays and n*m fraction delays of the n*m sub-channels by using the separation variable method. A formula is:

$$\begin{cases} \Delta t_{ti} = \min_t \left\{ \sum_{j=1}^{m} ((\Delta_{ij} + \tau_{ij}) - \Delta t_{rj}) - m \cdot t \right\} \\ \Delta t_{ri} = \min_t \left\{ \sum_{j=1}^{m} ((\Delta_{ji} + \tau_{ji}) - \Delta t_{tj}) - n \cdot t \right\} \end{cases}$$

where $\Delta t_{ti}$ is a transmit delay of an $i^{th}$ transmit channel, $\Delta t_{ri}$ is a receive delay of an $i^{th}$ receive channel, $\Delta_{ij}$ is an integer delay from the $i^{th}$ transmit channel to a $j^{th}$ receive channel, and $\tau_{ij}$ is a fraction delay from the $i^{th}$ transmit channel to the $j^{th}$ receive channel.

S207: The receiver returns, to the transmitter, n transmit delays that are separated out, so that the transmitter separately performs delay compensation on corresponding transmit channels according to the n transmit delays.

Specifically, the receiver returns the n transmit delays that are separated out in step 206 to the transmitter by using a feedback channel, the transmitter separately performs delay compensation on the corresponding transmit channels, and the transmitter performs, according to the transmit delays, delay compensation on a digital signal that carries symbol information, so as to achieve relative synchronization with a transmit channel in the reference sub-channel.

S208: The receiver separately performs delay compensation on corresponding receive channels according to the receive delays.

Specifically, the receiver separately performs delay compensation on the corresponding receive channels according to the m receive delays that are separated out in step 206, and the receiver performs, according to the receive delays, delay compensation on a digital signal that carries symbol information, so as to achieve relative synchronization with a receive channel in the reference sub-channel.

In this embodiment of the present invention, when the receiver starts working, an initial compensation of each transmit channel and an initial compensation of each receive channel are both 0. The receiver estimates a channel response matrix at this moment according to a receive signal, and estimates delays (which are obtained by superimposing integer delays and fraction delays) between sub-channels according to the currently obtained channel response matrix. The receiver further separates out delays of transmit channels and delays of receive channels from the obtained delays, and the transmitter and the receiver separately perform time compensation according to the delays, to achieve relative synchronization of the transmit channels and the receive channels.

The receiver repeats the foregoing process according to a channel response matrix of a compensated receive signal, and the entire system enters a closed-loop work state, so as to achieve objectives of tracking multichannel delays and online compensation.

According to the description in the foregoing embodiment, the present invention has the following advantages:

By estimating a channel response matrix of a MIMO communications system, a receiver calculates a fraction delay of each sub-channel and an integer delay relative to a reference sub-channel, and separates out a transmit delay of each transmit channel and a receive delay of each receive channel by using an obtained calculation result, so that delays at a receive end and a transmit end in the MIMO communications system can be measured online in real time, and high measurement precision is achieved.

Figure 5:
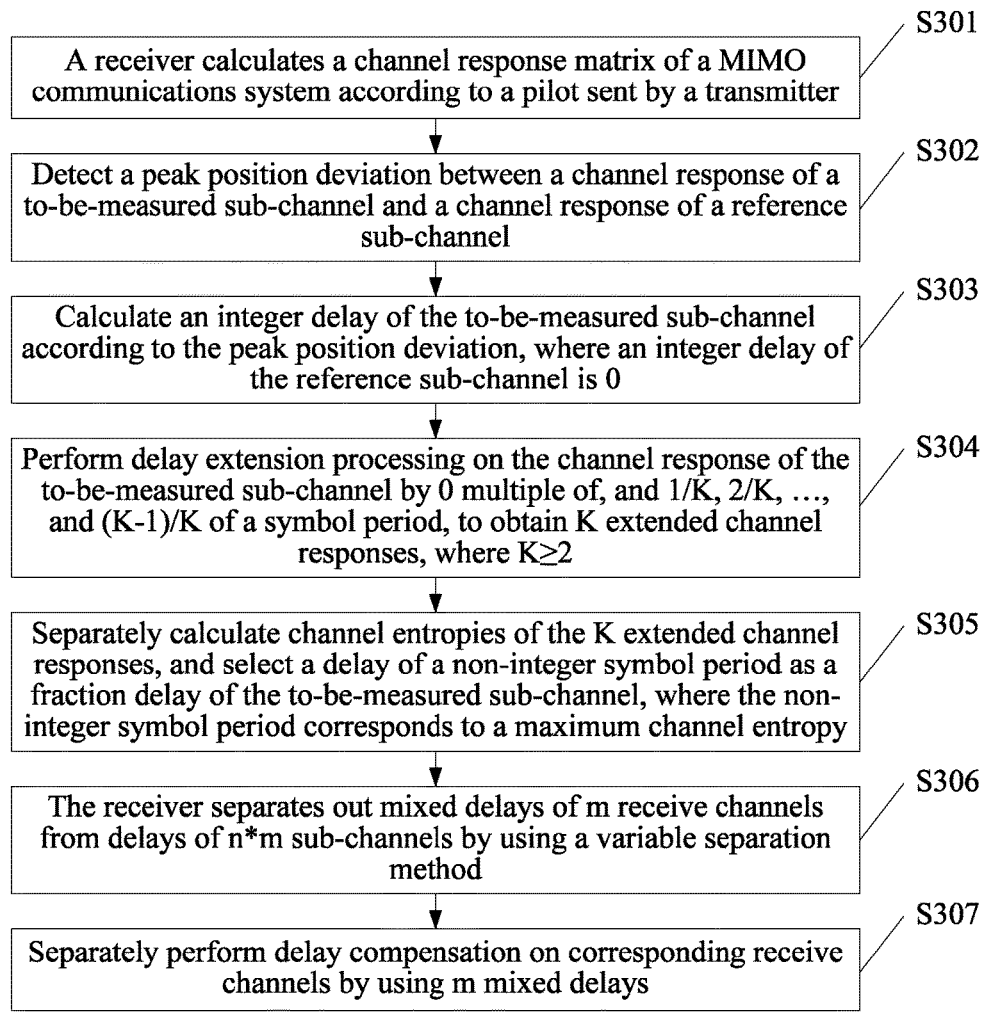
FIG. 5 is still another schematic flowchart of a delay estimation method for a multiple input multiple output communications system according to an embodiment of the present invention.

Referring to FIG. 5, FIG. 5 is another schematic flowchart of a delay estimation method for a multiple input multiple output communications system according to an embodiment of the present invention. In this embodiment, the method includes:

S301: A receiver calculates a channel response matrix of a MIMO communications system according to a pilot sent by a transmitter.

S302: Detect a peak position deviation between a channel response of a to-be-measured sub-channel and a channel response of a reference sub-channel.

S303: Calculate an integer delay of the to-be-measured sub-channel according to the peak position deviation, where an integer delay of the reference sub-channel is 0.

S304: Perform delay extension processing on the channel response of the to-be-measured sub-channel by 0 multiple of, and 1/K, 2/K, . . . , and (K−1)/K of a symbol period, to obtain K extended channel responses, where K≥2.

S305: Separately calculate channel entropies of the K extended channel responses, and select a delay of a non-integer symbol period as a fraction delay of the to-be-measured sub-channel, where the non-integer symbol period corresponds to a maximum channel entropy.

S301 to S305 and the second method embodiment are based on a same conception, and technical effects brought by S301 to S305 are also the same as those in the method embodiment of the present invention. For specific content, reference may be made to the description in the second method embodiment of the present invention. Details are not provided again herein.

S306: The receiver separates out mixed delays of m receive channels from delays of n*m sub-channels by using a variable separation method.

Specifically, a mixed signal received on a receive channel of the receiver includes n different delays, which are obtained by superimposing n transmit delays of the transmitter and a receive delay of the receive channel. The receiver cannot compensate, only on the receive channel, n different transmit channels for transmit delays. A best compensation policy is that the receiver compensates, on the receive channel, the transmitter for an average value of n transmit delays, and a remaining relative delay is a difference between a transmit delay of each transmit channel and the average value.

Optionally, in this embodiment of the present invention, the transmitter further separates out the mixed delays of the m receive channels according to the delays of the n*m sub-channels. An operating principle is as follows:

$$t'_{ri} = \min_t \left\{ \sum_{j=1}^{m} ((\Delta_{ji} + \tau_{ji}) - \Delta t_{ij}) - n \cdot t \right\}.$$

Optionally, the receiver may further calculate a mixed delay of a receive channel according to a transmit delay of a transmit channel and a receive delay of the receive channel. It is assumed that the transmit delay of the transmit channel that is separated out is $\Delta t_{ti}$, where $1 \le i \le n$, and the receive delay of the receive channel that is separated out is $\Delta t_{ri}$; and then the mixed delay of the receive channel is expressed as a result of superimposing an average value of transmit delays of n transmit channels and a receive delay of the receive channel. A mixed delay of a receive channel 1 is used as an example, and the mixed delay of the receive channel 1 is:

$$\frac{(\Delta t_{t1} + \Delta t_{t2} + \Delta t_{t3} + \ldots + \Delta t_{tn})}{n} + \Delta t_{r1}.$$

In this embodiment, the average value of the transmit delays of the n transmit channels may also be calculated by using another method, such as a weighted average value method or an arithmetic average value method, which is not limited in the present invention.

S307: Separately perform delay compensation on corresponding receive channels by using m mixed delays.

In this embodiment of the present invention, the transmitter performs delay compensation only on a receive channel. Because there is no delay compensation on the side of the transmitter, a feedback channel does not need to be established, and a structure of the system is simpler.

It should be noted that all embodiments in the present specification use a progressive manner for description. Each embodiment focuses on a difference from other embodiments, and for the same or similar parts of the embodiments, reference may be made to each other. The apparatus embodiments are described briefly because they are basically similar to the method embodiments, and for relevant parts, reference may be made to the description of the method embodiments.

Figure 6:
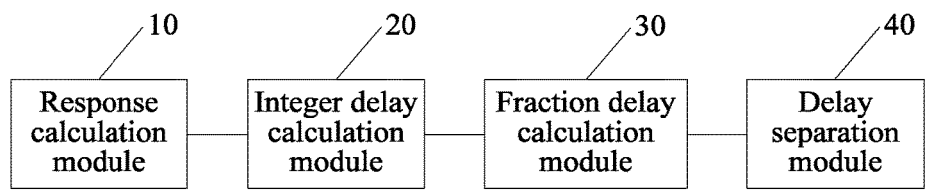
FIG. 6 is a schematic structural diagram of a delay estimation apparatus for a multiple input multiple output communications system according to a first embodiment of the present invention.

Referring to FIG. 6, FIG. 6 is a schematic structural diagram of a delay estimation apparatus for a multiple input multiple output communications system according to a first embodiment of the present invention. In this embodiment, the apparatus includes:

A response calculation module 10 is configured to calculate a channel response matrix of a Multiple input multiple output MIMO communications system, where there are n transmit channels and m receive channels in the MIMO communications system, n≥2, m≥2, and the channel response matrix includes channel responses of n*m sub-channels.

Specifically, there are n transmit channels and m receive channels in the MIMO communications system, where n≥2 and m≥2. The response calculation module 10 may calculate the channel response matrix of the MIMO communications system according to a pilot in a transmit signal, which is specifically: y=H*x+p, where y is a receive signal, H is a channel response matrix, x is a pilot, p is a noise of a receiver, and the channel response matrix, which is calculated by the receiver, of the n*m sub-channels is as follows:

$$H = \begin{bmatrix} h_{11} & h_{12} & \ldots & h_{1m} \\ h_{21} & h_{22} & \ldots & h_{2m} \\ \ldots & \ldots & h_{ij} & \ldots \\ h_{n1} & h_{n2} & \ldots & h_{nm} \end{bmatrix}$$

where $h_{ij}$ is a channel response of a sub-channel $C_{ij}$ that is formed from an $i^{th}$ transmit channel to a $j^{th}$ receive channel in the MIMO communications system, where $1 \le i \le n$, $1 \le j \le m$, and there are channel responses of the n*m sub-channels in the channel response matrix.

It may be understood that, the response calculation module 10 may also estimate the channel response matrix by using another method, for example, estimate the channel response matrix of the MIMO communications system directly by using a received transmit signal, where the channel response matrix may be a time-domain channel response matrix or a frequency-domain channel response matrix, which is not limited in the present invention.

An integer delay calculation module 20 is configured to calculate an integer delay, relative to a reference sub-channel, of each of the n*m sub-channels according to the channel response matrix, where the reference sub-channel is any sub-channel in the n*m sub-channels.

Specifically, any sub-channel is selected from the n*m sub-channels in advance and is used as a reference sub-channel for alignment, and integer delays of other sub-channels are all relative integer delays that are calculated according to the reference sub-channel. In the following exemplary description, it is assumed that, a sub-channel $C_{11}$ that is formed from a first transmit channel to a first receive channel is the reference sub-channel, and a channel response of the reference sub-channel is $h_{11}$.

The integer delay calculation module 20 calculates the integer delay, relative to the reference sub-channel, of each sub-channel in the n*m sub-channels, where the integer delay is an integer multiple of a symbol period, and the symbol period refers to element duration in a communications system, that is, a reciprocal of a sampling rate. A method for calculating the integer delay by the integer delay calculation module 20 may be an autocorrelation method or a sequence synchronization method, which is not limited in the present invention. It may be understood that, an integer delay of the reference sub-channel is calculated by using the reference sub-channel as a reference object, and a value of the integer delay is 0.

A fraction delay calculation module 30 is configured to calculate fraction delays of the n*m sub-channels according to the channel response matrix.

Specifically, a fraction delay is a fractional multiple of the symbol period, the symbol period is less than a multiple of 1, and a delay of each sub-channel in the n*m sub-channels includes an integer delay and a fraction delay. A delay of the sub-channel $C_{ij}$ is set to $\Delta T_{ij}=\Delta_{ij}+\tau_{ij}$, where $\Delta_{ij}$ is an integer delay, $\tau_{ij}$ is a fraction delay, $1 \leq i \leq n$, and $1 \leq j \leq m$.

The receiver calculates the integer delay, relative to the reference sub-channel, of each of the n*m sub-channels by using the integer delay calculation module 20, to obtain n*m integer delays, and calculates the fraction delays of the n*m sub-channels by using the fraction delay calculation module 30, to obtain n*m fraction delays.

A delay separation module 40 is configured to separate out delays of the m receive channels according to delays of the n*m sub-channels.

Specifically, the delays of the m receive channels are receive delays or mixed delays, where a receive delay refers to a delay that occurs after a receive signal passes through a receive channel, and a mixed delay refers to a delay that occurs after a signal passes through a transmit channel and a receive channel. The delay separation module 40 separates out transmit delays of the n transmit channels and receive delays of the m receive channels according to n*m delays, where the n*m delays herein are obtained by superimposing the integer delays and the fraction delays. The delays obtained by means of estimation by the integer delay calculation module 20 and the fraction delay calculation module 30 are n×m delays after the transmit channels and the receive channels are cross-superimposed. A delay that is obtained by superimposing the m receive delays in a cross channel manner approximates a sum of an integer delay and a fraction delay that are estimated in the foregoing, where the m receive delays are separated out by the receiver by using a separation algorithm. The separation algorithm is not limited in the present invention, for example, the delay separation module 40 may use a simple variable separation method as a solution.

It may be understood that, in this embodiment of the present invention, the delay estimation apparatus periodically calculates the channel response matrix of the MIMO communications system, estimates a delay of each transmit channel and a delay of each receive channel by using the channel response matrix, and monitors a change in the delays in real time.

Figure 7:
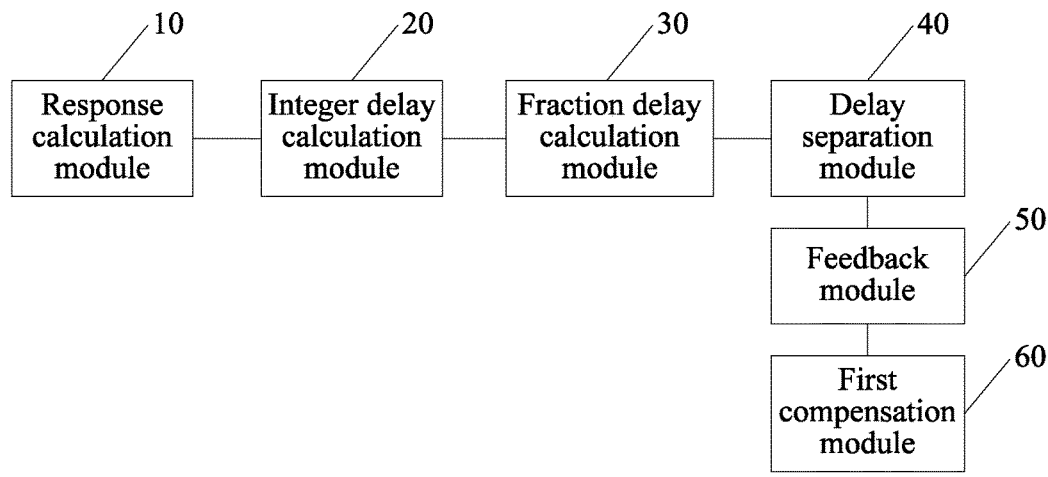
FIG. 7 is a schematic structural diagram of a delay estimation apparatus for a multiple input multiple output communications system according to a second embodiment of the present invention.

Further, referring to FIG. 7, FIG. 7 is a schematic structural diagram of a delay estimation apparatus for a multiple input multiple output communications system according to a second embodiment of the present invention. In addition to the response calculation module 10, the integer delay calculation module 20, the fraction delay calculation module 30, and the delay separation module 40, the apparatus further includes a feedback module 50 and a first compensation module 60, where the delays of the m receive channels are receive delays of the receive channels.

The feedback module 50 is configured to separate out transmit delays of the n transmit channels according to the delays of the n*m sub-channels, and return n transmit delays to the transmitter, so that the transmitter separately performs delay compensation on corresponding transmit channels according to the n transmit delays.

The first compensation module 60 is configured to separately perform delay compensation on corresponding receive channels according to m receive delays.

A process of interaction between the modules in this embodiment and that in the second method embodiment are based on a same conception, and technical effects brought by this embodiment are also the same as those in the method embodiment of the present invention. For specific content, reference may be made to the description in the method embodiment of the present invention. Details are not provided again herein.

Figure 8:
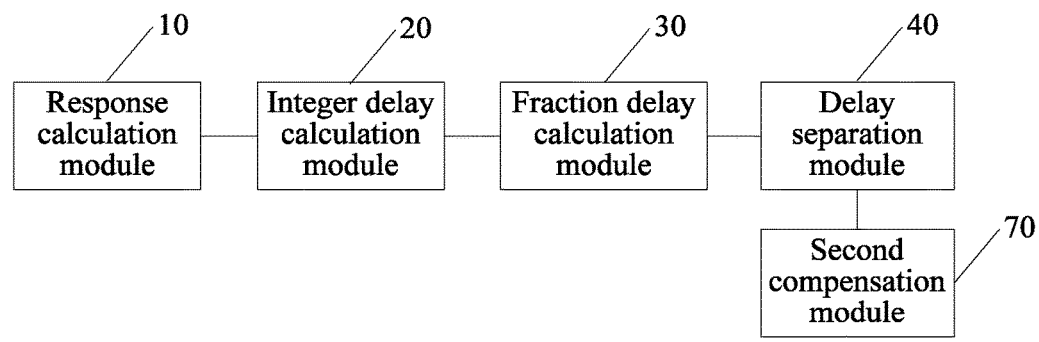
FIG. 8 is a schematic structural diagram of a delay estimation apparatus for a multiple input multiple output communications system according to a third embodiment of the present invention.

Referring to FIG. 8, FIG. 8 is a schematic structural diagram of a delay estimation apparatus for a multiple input multiple output communications system according to a third embodiment of the present invention. In addition to the response calculation module 10, the integer delay calculation module 20, the fraction delay calculation module 30, and the delay separation module 40, the apparatus further includes a second compensation module 70, where the delays of the m receive channels are mixed delays of the receive channels.

The second compensation module 70 is configured to separately perform delay compensation on corresponding receive channels by using m mixed delays.

A process of interaction between the modules in this embodiment and that in the third method embodiment are based on a same conception, and technical effects brought by this embodiment are also the same as those in the method embodiment of the present invention. For specific content, reference may be made to the description in the method embodiment of the present invention. Details are not provided again herein.

Figure 9:
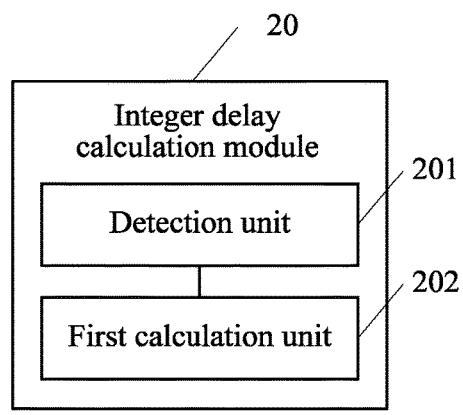
FIG. 9 is a schematic structural diagram of an integer delay calculation module in FIG. 6, FIG. 7, and FIG. 8.
Figure 10:
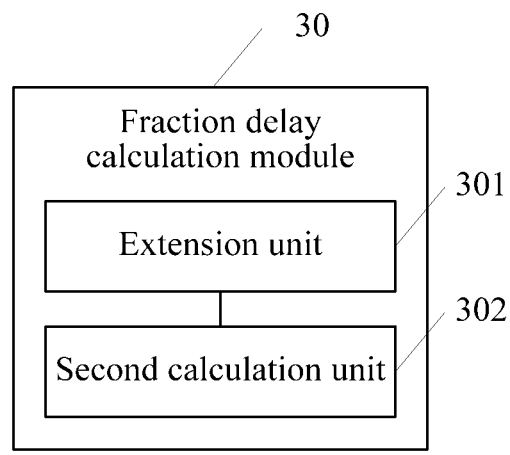
FIG. 10 is a schematic structural diagram of a fraction delay calculation module in FIG. 6, FIG. 7, and FIG. 8.

Further preferably, referring to FIG. 9 and FIG. 10, the integer delay calculation module 20 includes a detection unit 201 and a first calculation unit 202, where the detection unit 201 is configured to detect a peak position deviation between a channel response of a to-be-measured sub-channel and a channel response of the reference sub-channel; and The first calculation unit 202 is configured to calculate an integer delay of the to-be-measured sub-channel according to the peak position deviation, where an integer delay of the reference sub-channel is 0.

The fraction delay calculation unit includes an extension unit 301 and a second calculation unit 302, where the extension unit 301 is configured to separately perform delay extension processing on the channel response of the to-be-measured sub-channel by 0 multiple of, and 1/K, 2/K, . . . , and (K−1)/K of a symbol period, to obtain K extended channel responses, where K≥2 and is an integer; and the second calculation unit 302 is configured to separately calculate channel entropies of the K extended channel responses, and select a delay of a non-integer symbol period as a fraction delay of the to-be-measured sub-channel, where the non-integer symbol period corresponds to a maximum channel entropy.

Figure 11:
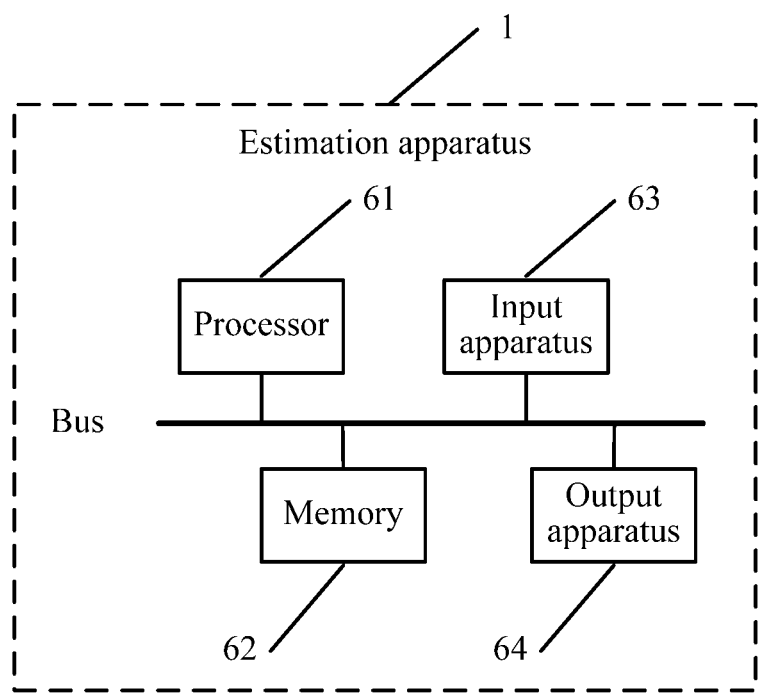
FIG. 11 is a schematic structural diagram of a delay estimation apparatus for a multiple input multiple output communications system according to a fourth embodiment of the present invention.

Referring to FIG. 11, FIG. 11 is a schematic structural diagram of a delay estimation apparatus for a multiple input multiple output communications system according to a fourth embodiment of the present invention. The apparatus is referred to as an estimation apparatus 1 in the following, where the estimation apparatus 1 includes a processor 61, a memory 62, an input apparatus 63, and an output apparatus 64, and there may be one or more processors 61 in the estimation apparatus 1. In FIG. 11, that there is one processor is used as an example. In some embodiments of the present invention, the processor 61, the memory 62, the input device 63, and the output device 64 may be connected by using a bus or in another manner. In FIG. 11, that they are connected by using the bus as an example.

The memory 62 stores a set of program code, and the processor 61 is configured to invoke the program code stored in the memory 62, to perform the following operations:

calculating a channel response matrix of a Multiple input multiple output MIMO communications system, where there are n transmit channels and m receive channels in the MIMO communications system, n≥2, m≥2, and the channel response matrix includes channel responses of n*m sub-channels;

calculating an integer delay, relative to a reference sub-channel, of each of the n*m sub-channels according to the channel response matrix, where the reference sub-channel is any sub-channel in the n*m sub-channels;

calculating fraction delays of the n*m sub-channels according to the channel response matrix; and separating out delays of the m receive channels according to delays of the n*m sub-channels.

Preferably, the processor 61 is specifically configured to detect a peak position deviation between a channel response of a to-be-measured sub-channel and a channel response of the reference sub-channel; and calculate an integer delay of the to-be-measured sub-channel according to the peak position deviation, where an integer delay of the reference sub-channel is 0.

Preferably, the processor 61 is specifically configured to:

perform delay extension processing on the channel response of the to-be-measured sub-channel by 0 multiple of, and 1/K, 2/K, . . . , and (K−1)/K of a symbol period, to obtain K extended channel responses, where K≥2 and is an integer; and separately calculate channel entropies of the K extended channel responses, and select a delay of a non-integer symbol period as a fraction delay of the to-be-measured sub-channel, where the non-integer symbol period corresponds to a maximum channel entropy.

Preferably, the processor 61 is specifically configured to calculate the channel response matrix of the MIMO communications system according to a pilot sent by a transmitter.

Preferably, the channel response matrix includes a time-domain channel response matrix or a frequency-domain channel response matrix.

Preferably, the delays of the m receive channels are receive delays of the receive channels, and the processor 61 is further configured to:

separate out transmit delays of the n transmit channels according to the delays of the n*m sub-channels, and returning n transmit delays to the transmitter, so that the transmitter separately performs delay compensation on corresponding transmit channels according to the n transmit delays; and separately perform delay compensation on corresponding receive channels according to m receive delays.

Preferably, the delays of the m receive channels are mixed delays of the receive channels, and the processor 61 is further configured to:

separately perform delay compensation on corresponding receive channels by using m mixed delays.

Preferably, the processor 61 is specifically configured to separate out the transmit delays of the n transmit channels and the receive delays of the m receive channels from the delays of the n*m sub-channels by using a variable separation method.

According to the description in the foregoing embodiment, the present invention has the following advantages:

By estimating a channel response matrix of a MIMO communications system, a receiver calculates a fraction delay of each sub-channel and an integer delay relative to a reference sub-channel, and separates out a delay of each receive channel by using an obtained calculation result, so that a delay at a receive end in the MIMO communications system can be measured online in real time, and high measurement precision is achieved.

Figure 12:
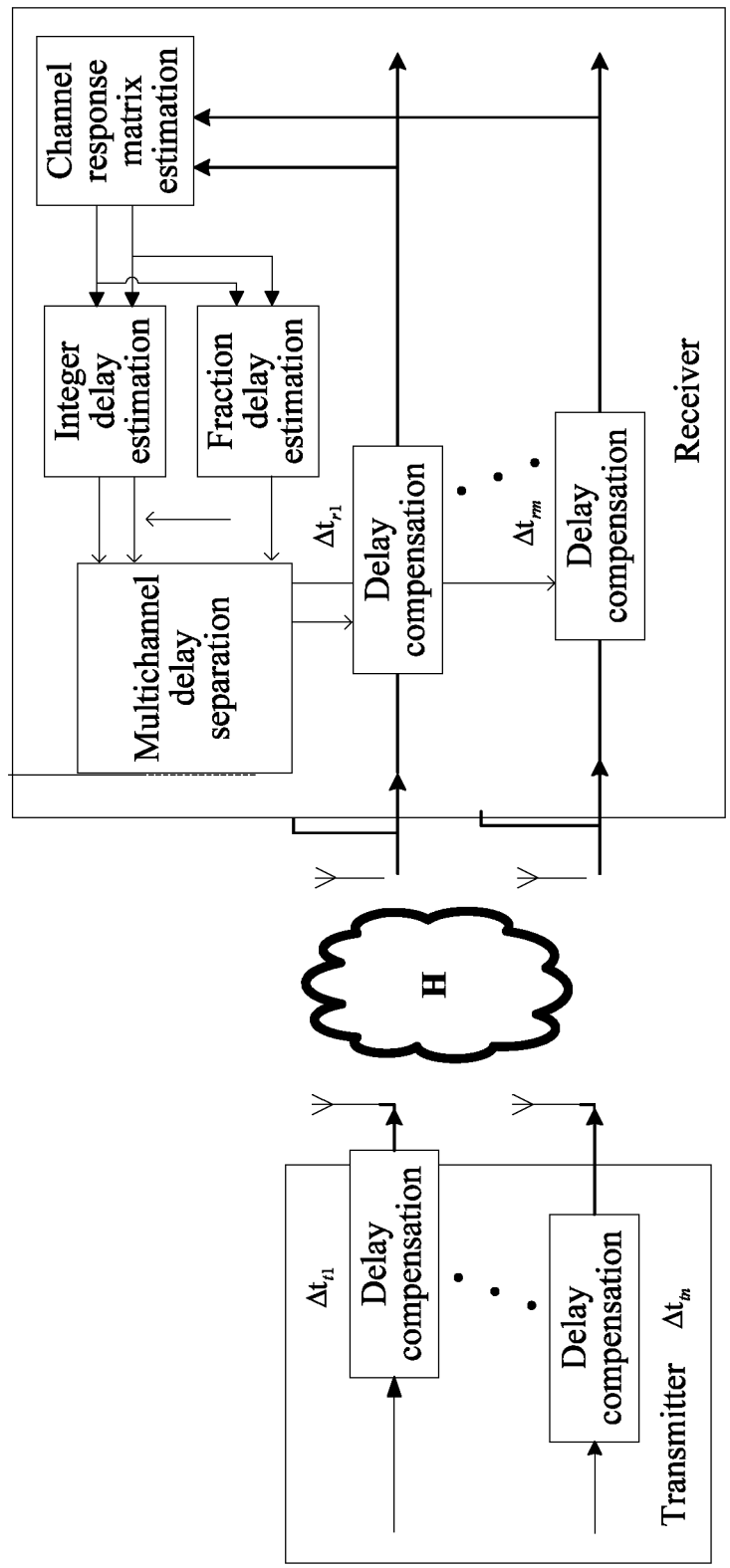
FIG. 12 is a schematic structural diagram of a multiple input multiple output communications system according to a first embodiment of the present invention.

Referring to FIG. 12, FIG. 12 is a schematic structural diagram of a multiple input multiple output communications system according to a first embodiment of the present invention. In this embodiment of the present invention, the communications system includes a transmitter and a receiver, where the transmitter has n transmit channels and the receiver has m receive channels. When the communications system starts working, an initial delay compensation for each transmit channel and an initial delay compensation for each receive channel are 0. The receiver calculates a channel response matrix according to a signal transmitted by the transmitter, the receiver calculates an integer delay and a fraction delay of each sub-channel according to the channel response matrix, and the receiver separates out, by using a separation algorithm, transmit delays of the n transmit channels and receive delays of the m receive channels in calculated integer delays and fraction delays of the n*m sub-channels. In FIG. 12, $\Delta_{t1}$-$\Delta_{tn}$ are the transmit delays of the n transmit channels on the side of the transmitter; and $\Delta_{r1}$-$\Delta_{rm}$ are the receive delays of the m receive channels on the side of the receiver.

The receiver returns n transmit delays to the transmitter through a feedback channel, and the transmitter performs delay compensation on the transmit channels by using the transmit delays; and the receiver performs delay compensation on the receive channels by using the receive delays.

After working for a period of time, the receiver estimates the channel response matrix by using signals obtained after the delay compensation is performed on the transmit channels and the delay compensation is performed on the receive channels, and repeats the foregoing process; in this way, the entire system enters a closed-loop work state, so as to achieve objectives of tracking multichannel delays and online compensation.

Figure 13:
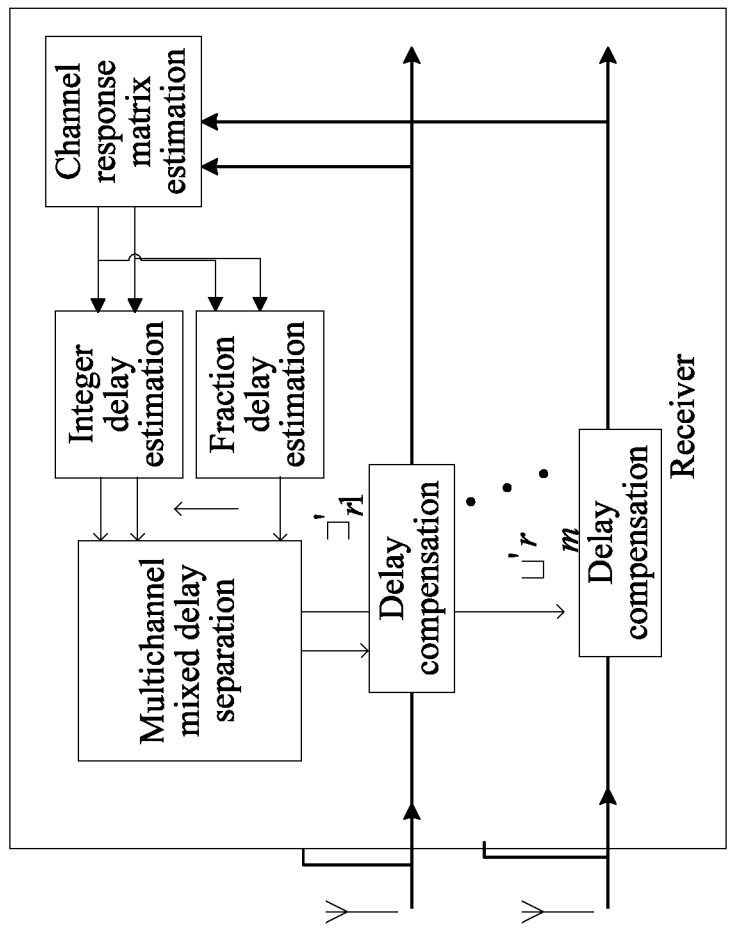
FIG. 13 is a schematic structural diagram of a multiple input multiple output communications system according to a second embodiment of the present invention.
Figure 13:
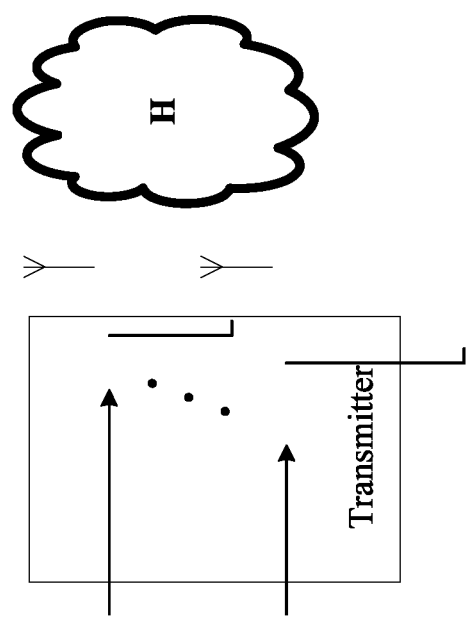

Referring to FIG. 13, FIG. 13 is a schematic structural diagram of a multiple input multiple output communications system according to a second embodiment of the present invention. In this embodiment of the present invention, the communications system includes a transmitter and a receiver, where the transmitter has n transmit channels and the receiver has m receive channels. When the communications system starts working, an initial delay compensation for each transmit channel and an initial delay compensation for each receive channel are 0. The receiver calculates a channel response matrix according to a signal transmitted by the transmitter, and the receiver calculates an integer delay and a fraction delay of each sub-channel according to the channel response matrix, and estimates mixed delays of the receive channels according to the channel response matrix. A mixed signal received on a receive channel of the receiver includes n different delays, which are obtained by superimposing n transmit delays of the transmitter and a receive delay of the receive channel. The receiver cannot compensate, only on the receive channel, n different transmit channels for transmit delays. A best compensation policy is that the receiver compensates, on the receive channel, the transmitter for an average value of n transmit delays, that is, a mixed delay of the receive channel, and a remaining relative delay is a difference between a transmit delay of each transmit channel and the average value. In FIG. 13, $\Delta'_{r1}$-$\Delta'_{rm}$ are mixed delays of the m receive channels.

After working for a period of time, the receiver estimates the channel response matrix according to a signal obtained after the delay compensation is performed, and repeats the foregoing process; in this way, the entire system enters a closed-loop work state, so as to achieve objectives of tracking multichannel delays and online compensation.

In this embodiment of the present invention, the transmitter performs delay compensation only on a receive channel. Because there is no delay compensation on the side of the transmitter, a feedback channel does not need to be established, and a structure of the system is simpler.

A person of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes: any medium that can store program code, such as a ROM, a RAM, a magnetic disk, or an optical disc.

The delay estimation method, apparatus, and system for a multiple input multiple output communications system that are provided in the embodiments of the present invention are described in detail in the foregoing. In this specification, specific examples are used to describe the principle and implementation manners of the present invention, and the description of the foregoing embodiments is only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for a multiple input multiple output (MIMO) communications system, comprising:
    estimating delay between channels in the MIMO communications system, comprising:
        calculating, by a receiver, a channel response matrix of the Multiple input multiple output MIMO communications system according to a pilot sent by a transmitter, wherein there are n transmit channels and m receive channels in the MIMO communications system, n≥2, m≥2, n and m are both integers, and the channel response matrix comprises channel responses of n*m sub-channels;
        calculating, by the receiver, an integer delay, relative to a reference sub-channel, of each of the n*m sub-channels according to the channel response matrix, wherein the reference sub-channel is any sub-channel in the n*m sub-channels;
        calculating, by the receiver, fraction delays of the n*m sub-channels according to the channel response matrix; and
        separating out, by the receiver, delays of the m receive channels according to delays of the n*m sub-channels; and
    compensating for the delay between the channels in the MIMO communications system based on the estimating, comprising:
        separating out, by the receiver, transmit delays of the n transmit channels according to the delays of the n*m sub-channels, and returning n transmit delays to the transmitter, so that the transmitter separately performs delay compensation on corresponding transmit channels according to the n transmit delays; and
        separately performing, by the receiver, delay compensation on corresponding receive channels.

2. The method according to claim 1, wherein the step of calculating, by the receiver, an integer delay, relative to a reference sub-channel, of each of the n*m sub-channels according to the channel response matrix comprises:
    detecting a peak position deviation between a channel response of a to-be-measured sub-channel and a channel response of the reference sub-channel; and
    calculating an integer delay of the to-be-measured sub-channel according to the peak position deviation, wherein an integer delay of the reference sub-channel is 0.

3. The method according to claim 1, wherein the step of calculating, by the receiver, fraction delays of the n*m sub-channels according to the channel response matrix comprises:
    performing delay extension processing on the channel response of the to-be-measured sub-channel by 0 multiple of, and 1/K, 2/K, . . . , and (K−1)/K of a symbol period, to obtain K extended channel responses, wherein K≥2 and is an integer; and
    separately calculating channel entropies of the K extended channel responses, and selecting a delay of a non-integer symbol period as a fraction delay of the to-be-measured sub-channel, wherein the non-integer symbol period corresponds to a maximum channel entropy.

4. The method according to claim 1, wherein the channel response matrix comprises a time-domain channel response matrix or a frequency-domain channel response matrix.

5. The method according to claim 4, wherein the delays of the m receive channels are receive delays of the receive channels, and the method further comprises:
    separately performing, by the receiver, delay compensation on corresponding receive channels according to m receive delays.

6. The method according to claim 4, wherein the delays of the m receive channels are mixed delays of the receive channels, and the method further comprises:
    separately performing, by the receiver, delay compensation on corresponding receive channels by using m mixed delays.

7. The method according to claim 1, wherein the step of separating out, by the receiver, delays of the m receive channels according to delays of the n*m sub-channels comprises:
    separating out, by the receiver, the delays of the m receive channels from the delays of the n*m sub-channels by using a variable separation method.

8. An apparatus for a multiple input multiple output (MIMO) communications system, comprising:

a processor;

a memory;

an input apparatus; and an output apparatus, wherein the memory stores a set of program code, and the processor is configured to invoke the program code that is stored in the memory, to perform the following operations:

estimating delay between channels in the MIMO communications system, comprising:

calculating a channel response matrix of a Multiple input multiple output MIMO communications system according to a pilot sent by a transmitter, wherein there are n transmit channels and m receive channels in the MIMO communications system, n≥2, m≥2, n and m are both integers, and the channel response matrix comprises channel responses of n*m sub-channels;

calculating an integer delay, relative to a reference sub-channel, of each of the n*m sub-channels according to the channel response matrix, wherein the reference sub-channel is any sub-channel in the n*m sub-channels;

calculating fraction delays of the n*m sub-channels according to the channel response matrix; and separating out delays of the m receive channels according to delays of the n*m sub-channels; and compensating for the delay between the channels in the MIMO communications system based on the estimating, comprising:

separating out transmit delays of the n transmit channels according to the delays of the n*m sub-channels, and returning n transmit delays to the transmitter, so that the transmitter separately performs delay compensation on corresponding transmit channels according to the n transmit delays; and separately performing delay compensation on corresponding receive channels.

9. The apparatus according to claim 8, wherein the processor is configured to detect a peak position deviation between a channel response of a to-be-measured sub-channel and a channel response of the reference sub-channel; and calculate an integer delay of the to-be-measured sub-channel according to the peak position deviation, wherein an integer delay of the reference sub-channel is 0.

10. The apparatus according to claim 8, wherein the processor is configured to perform the following operations:

performing delay extension processing on the channel response of the to-be-measured sub-channel by 0 multiple of, and 1/K, 2/K, . . . , and (K−1)/K of a symbol period, to obtain K extended channel responses, wherein K≥2 and is an integer; and separately calculating channel entropies of the K extended channel responses, and selecting a delay of a non-integer symbol period as a fraction delay of the to-be-measured sub-channel, wherein the non-integer symbol period corresponds to a maximum channel entropy.

11. The apparatus according to claim 8, wherein the channel response matrix comprises a time-domain channel response matrix or a frequency-domain channel response matrix.

12. The apparatus according to claim 11, wherein the delays of the m receive channels are receive delays of the receive channels, and the processor is further configured to perform the following operations:

separately performing delay compensation on corresponding receive channels according to m receive delays.

13. The apparatus according to claim 11, wherein the delays of the m receive channels are mixed delays of the receive channels, and the processor is further configured to:

separately perform delay compensation on corresponding receive channels by using m mixed delays.

14. The apparatus according to claim 8, wherein the processor is configured to separate out the delays of the m receive channels from the delays of the n*m sub-channels by using a variable separation method.

* * * * *